United States Patent
Yadav et al.

(10) Patent No.: US 10,057,403 B1
(45) Date of Patent: Aug. 21, 2018

(54) ADJUSTABLE DEVICE SETTINGS

(71) Applicant: Microsoft Technology Licensing, LLC, Redmond, WA (US)

(72) Inventors: Mahesh Yadav, Redmond, WA (US); Srinivasa Lakshmana Rao, Redmond, WA (US); Tae Hwan Jung, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/452,570

(22) Filed: Mar. 7, 2017

(51) Int. Cl.
  *H04M 3/00* (2006.01)
  *H04M 1/725* (2006.01)
  *H04W 4/02* (2018.01)

(52) U.S. Cl.
  CPC ......... *H04M 1/72563* (2013.01); *H04W 4/02* (2013.01)

(58) Field of Classification Search
  CPC ............................ H04M 1/72563; H04W 4/02
  USPC ........................................................ 455/419
  See application file for complete search history.

(56) References Cited

U.S. PATENT DOCUMENTS

| | | | | |
|---|---|---|---|---|
| 7,542,451 B2* | 6/2009 | Cooper | .................. | H04W 8/26 370/319 |
| 8,958,823 B2* | 2/2015 | Ortiz | ...................... | H04W 4/02 370/328 |
| 8,996,030 B2* | 3/2015 | Grainger | ............... | G01S 5/0257 455/456.1 |
| 9,154,555 B2 | 10/2015 | Naaman | | |
| 9,277,492 B2 | 3/2016 | Juang et al. | | |
| 2006/0075487 A1 | 4/2006 | Pfleging et al. | | |
| 2011/0039559 A1 | 2/2011 | Yi et al. | | |
| 2012/0077495 A1 | 3/2012 | Kim et al. | | |
| 2013/0005337 A1 | 1/2013 | Ali et al. | | |
| 2013/0217391 A1 | 8/2013 | Klatt et al. | | |
| 2014/0066018 A1 | 3/2014 | Zhu | | |
| 2015/0071268 A1 | 3/2015 | Kennedy et al. | | |
| 2016/0165530 A1 | 6/2016 | Sedlacek et al. | | |
| 2016/0205527 A1 | 7/2016 | Hui et al. | | |

FOREIGN PATENT DOCUMENTS

| | | |
|---|---|---|
| EP | 2608578 | 6/2013 |
| WO | 2012143049 A1 | 10/2012 |

OTHER PUBLICATIONS

"UMTS Location Based Services", http://web.archive.org/web/20021018215452/http:/www.umtsworld.com/technology/lcs.htm, Published on: Oct. 18, 2002, 3 pages.

(Continued)

*Primary Examiner* — Amancio Gonzalez

(57) ABSTRACT

Adjustable device settings is described herein. In one or more implementations, a client device is configured with device settings that are compatible with multiple different geographical locations. The client device attaches to a wireless network via a wireless radio of the client device, and receives location information from the attached wireless network. The client device determines a current geographical location of the client device based at least in part on the location information received from the wireless network, and adjusts the device settings of the client device to conform to location-specific settings of the current geographical location.

20 Claims, 6 Drawing Sheets

(56) References Cited

OTHER PUBLICATIONS

"Camera shutter sound", https://msdn.microsoft.com/en-us/library/windows/hardware/dn757402(v=vs.85).aspx, Retrieved on: Oct. 6, 2016, 2 pages.
"Wireless Emergency Alerts", https://en.wikipedia.org/wiki/Wireless_Emergency_Alerts, Retrieved on: Oct. 6, 2016, 4 pages.
"International Search Report and Written Opinion", Application No. PCT/US2018/020064, dated May 4, 2018, 10 pages.

* cited by examiner

400

402
Configure a client device with device settings that are compatible with multiple different geographical locations

404
Attach to a wireless network via a wireless radio of the client device

406
Receive location information from the attached wireless network

408
Determine a current geographical location of the client device based at least in part on the location information received from the attached wireless network

410
Adjust the device settings of the client device to conform to location-specific settings of the current geographical location

412
Adjust the device settings of the client device to conform to provider-specific settings of a provider of the attached wireless network

Fig. 4

ADJUSTABLE DEVICE SETTINGS

BACKGROUND

Manufacturers of electronic devices must often create multiple versions of the device so that the device is legally compliant in different countries or regions. In Japan, for example, privacy laws require that all electronic devices equipped with a camera must be configured to output an audible shutter sound when a picture is taken using the camera. However, users of the device in other countries, which do not require the audible shutter sound, may not want the audible shutter sound enabled. As such, in order to manufacture a device with a camera that will be sold in Japan and other countries, such as the United States, at least two versions of the device must be manufactured, one in which the audible shutter sound is enabled, and one in which the audible shutter sound is disabled. As a result, manufacturers must maintain different stations and machinery in order to make different versions of devices which are shipped to different countries.

SUMMARY

Adjustable device settings is described herein. In one or more implementations, a client device is configured with device settings that are compatible with multiple different geographical locations. The client device attaches to a wireless network via a wireless radio of the client device, and receives location information from the attached wireless network. The client device determines a current geographical location of the client device based at least in part on the location information received from the wireless network, and adjusts the device settings of the client device to conform to location-specific settings of the current geographical location.

In one or more implementations, a client device is configured with device settings that are compatible with multiple different geographical locations. The client device includes a wireless radio and an adjustable settings module. The adjustable settings module is configured to determine a current geographical location of the client device based on location information received from one or more wireless networks detected by the wireless radio, and adjust the device settings of the client device to conform to location-specific settings of the current geographical location.

In one or more implementations, a client device is configured with device settings that are compatible with multiple different countries. The client device attaches to a public land mobile network using a wireless radio of the client device, and receives a mobile country code from the public land mobile network. The mobile country code is compared to a previous mobile country code to determine if the mobile country code has changed. In response to determining that the mobile country code has changed, the device settings of the client device are adjusted to conform to country-specific settings of a country identified by the mobile country code. The device settings of the client device may also be adjusted to conform to operator-specific settings of an operator identified by a mobile network code received from the public land mobile network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The same numbers are used throughout the drawings to reference like features and components.

FIG. 4 illustrates an example method of adjustable device settings in accordance with one or more implementations.

DETAILED DESCRIPTION

Figure 1:
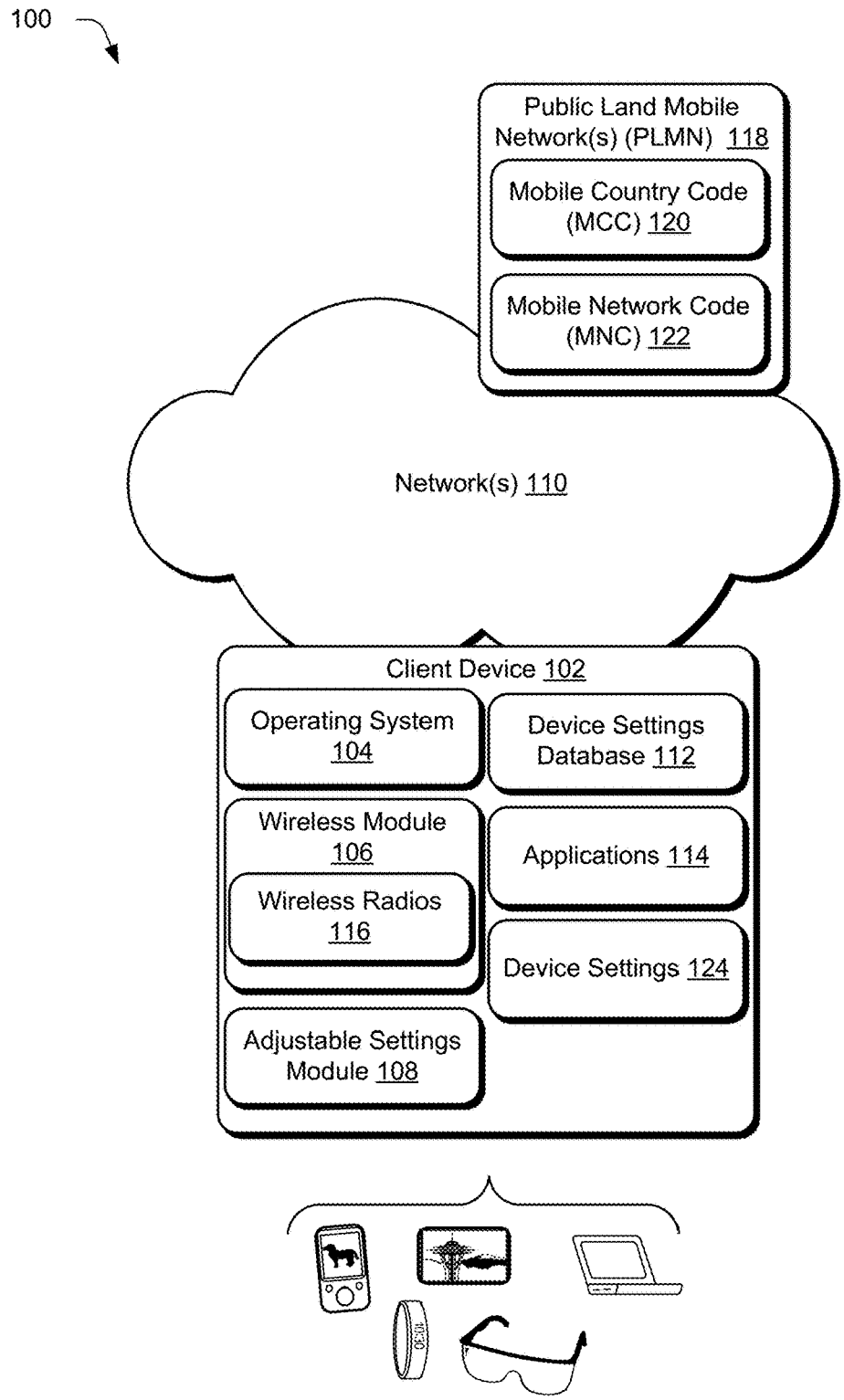
FIG. 1 is an illustration of an environment in an example implementation that is operable to support techniques described herein.

Adjustable device settings is described herein. In various implementations, a single version of a client device is manufactured and configured with device settings that are compatible with multiple geographical locations (e.g., countries or regions). The client device includes an adjustable settings module that is configured to determine the current geographical location of the client device based on location information received from a wireless network to which the client device is attached. The adjustable settings module can then adjust the device settings to conform to the current geographical location, such as by enabling or disabling various devices settings. In some cases, the adjustable settings module is further configured to adjust the device settings of the client device to conform to operator-specific settings of an operator (e.g., AT&T®, Sprint®, or Verizon®) of the attached wireless network.

In one or more implementations, the client device includes a wireless radio that is configured to scan for and attach to a public land mobile network (PLMN). A PLMN is a network that is established and operated by an administration or by a recognized operating agency for the specific purpose of providing land mobile telecommunications services to the public. Each PLMN is identified by a Mobile Country Code (MCC) which identifies the country of the PLMN, and a mobile network code (MNC) which identifies the operator of the PLMN. Thus, the adjustable settings module adjusts the device settings of the client device to conform to country-specific settings of a country identified by the MCC of the PLMN. The adjustable settings module may also adjust the device settings of the client device to conform to operator-specific settings of the operator identified by the MNC of the PLMN. To do so, the adjustable settings module compares the country identified by the MCC and the operator identified by the MNC to a device settings database that maps various device settings to different countries and/or operators.

Notably, rather than manufacturing multiple different versions of a client device in order to comply with varying legal requirements, the describes techniques enable manufacture of a single version of the client device (e.g., with a single stock keeping unit (SKU)) that is legally compliant in multiple different countries. Doing so simplifies the manufacturing process and reduces the costs associated with manufacturing multiple versions of a client device. The first time that the device attaches to a wireless network, however the device settings are dynamically adjusted to conform to legal requirements of the current country. Furthermore, if the device subsequently roams to a different country, the current country is detected based on attachment or detection of one or more wireless networks, and then the device settings can again be dynamically adjusted to ensure that the device is legally compliant with the current country in which the device is being used.

As an example, consider that a single version of a smartphone is manufactured to be sold in both Japan, where an audible shutter sound is required for camera use, and in the United States where the audile shutter sound is not required. As such, the smartphone is manufactured with the audible shutter sound enabled, a setting which cannot be modified by the user. If a user tried to use the device in Japan, without attaching to a wireless network, the smartphone would be legally compliant because the default configuration is to have the audible shutter sound enabled.

However, if a user activates the smartphone in the United States, the adjustable settings module detects that the smartphone is in the United States when the smartphone attaches to a PLMN based on the MCC of the PLMN. In one or more implementations, the adjustable settings module may also be able to determine the current location based on the detection of one or more wireless networks, even if the client device does not attach to a wireless network. For example, if multiple PLMNs are detected, the adjustable settings module can determine that the current country corresponds to the country identified by the MCCs of the detected PLMNs. In response to determining that the smartphone is in the United States, the adjustable settings module then adjusts the device settings by, among other things, disabling the audible shutter sound for the camera.

Subsequently, if the user travels to Japan with the smartphone, the wireless radio of the smartphone will attempt to attach to the previous wireless network. When it is unable to attach, it will begin roaming for other wireless networks. Based on the detection of, or attachment to, one or more wireless networks in Japan, the adjustable settings module determines the current location as Japan. As such, the device settings are automatically adjusted to conform to the legal requirements of Japan, which in this example includes enabling the audible shutter sound for the camera.

FIG. 1 is an illustration of an environment 100 in an example implementation that is operable to support techniques described herein. Environment 100 includes a client device 102 which can be embodied as any suitable device such as, by way of example and not limitation, a smartphone, a wearable device, a tablet computer, a portable computer (e.g., a laptop), a desktop computer, and so forth. One of a variety of different examples of the client device 102 is shown and described below in FIG. 6.

The client device 102 includes an operating system 104, a wireless module 106, an adjustable settings module 108, a device settings database 112, and applications 114. In one or more implementations, the adjustable settings module 108 is a component of the operating system 104. Generally, the operating system 104 is representative of functionality to manage resources of the client device 102 and may be implemented using any suitable instruction format. According to various implementations, the operating system 104 abstracts various resources of the client device 102 to enable various entities to access and interact with the resources.

The applications 114 are generally representative of functionalities to perform various tasks via the client device 102. As used herein, the term "applications" can refer to applications that are run locally and/or in a distributed environment, as well as services such as local services, web services, cloud-based services, and so forth. Examples of the applications 114 include a word processing application, a web browser, an email client, a communication service, a spreadsheet application, a content editing application, a web-based service portal, a geographic location service, and so forth.

The wireless module 106 is representative of functionality to enable the client device 102 to communicate wirelessly with other devices and/or entities. The wireless module 106 can be configured to enable data communication via a variety of different wireless techniques and protocols. Examples of such techniques and/or protocols include cellular communications (e.g. 3G, 4G, Long Term Evolution (LTE), and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16), wireless telephone networks, and so on.

The wireless module 106, for instance, includes hardware and logic components that can be employed to enable the client device 102 to communicate wirelessly. Examples of such wireless hardware components include radio transmitters, radio receivers, various types and/or combinations of antennas, and so on. In at least some implementations, the client device 102 is a multi-radio device that can communicate via different wireless technologies and/or protocols. For example, the wireless module 106 includes wireless radios 116 which are representative of hardware for transmitting and receiving wireless signals according to different wireless technologies and protocols.

According to various implementations, the client device 102 communicates wirelessly via connectivity to one or more networks 110. Generally, the networks 110 are representative of a combination of different interconnected networks. In at least some implementations, the networks 110 include different portions of the radio spectrum that may be leveraged for wireless communication. The networks 110, for instance, may include a cellular network, a wireless broadband network (e.g., Wi-Fi™), a satellite communication network, a short range wireless network (e.g., Bluetooth, near field communication (NFC), and so on), and so forth. The networks 110 may also represent a combination of wireless and wired networks and may be configured in a variety of ways, such as a wide area network (WAN), a local area network (LAN), the Internet, and so forth. Accordingly, communication between the client device 102 and other devices may be implemented via a variety of different technologies (wired and wireless), such as wireless broadband, Bluetooth, cellular, and so forth.

In one or more implementations, networks 110 include public land mobile networks 118 (PLMN 118). A PLMN 118 is a network that is established and operated by an administration or by a recognized operating agency for the specific purpose of providing land mobile telecommunications services to the public. Each PLMN 118 is identified by a Mobile Country Code 120 (MCC 120) and a mobile network code 122 (MNC 122). Each mobile network operator or carrier (e.g., Verizon®, Sprint®, and AT&T®) providing mobile services has its own PLMN 118. PLMNs 118 interconnect with other PLMNs as well as Public Switched Telephone networks (PSTN) for telephone communications or with internet service operators for data and internet access of which links are defined as interconnect links between operators.

The adjustable settings module 108 is representative of functionality to enable the client device 102 to ascertain its current geographical location based on location information received from one or more detected or attached networks 110. The current geographical location, in some instances, corresponds to a current country or a specific region within a country. For example, in one or more implementations, adjustable settings module 108 ascertains its current geographical location based on the MCC 120 received from a PLMN 118 to which the client device 102 is attached via wireless radio 116. Alternately, if a connection is not established with a network 110, the adjustable settings module 108 can ascertain its current geographical location based on location information associated with one or more detected networks 110. For example, wireless radios 116 can scan for and detect wireless signals of various PLMNs 118, even though no connection is established. The current geographical location, in this case, can then be ascertained based on the country identified by the MCC's 120 associated with each of the detected wireless signals of the PLMNs 118.

In one or more implementations, the adjustable settings module 108 may determine the current geographical location of client device 102 based at least in part on position information received from various position information systems. For example, position information received from various position information systems can be used in combination with location information associated with a wireless network 110 to determine the current geographical location of client device 102. Examples of position information include, by way of example and not limitations, GPS coordinates, street addresses, network location, location with reference to a cell tower and/or set of cell towers, and so forth.

The adjustable settings module 108 further includes functionality to adjust various device settings 124 of client device 102 based on an operator of the wireless network 110 to which the client device 102 is currently attached. For example, when client device 102 is attached to a PLMN 118, adjustable settings module 108 may adjust the device settings 124 based at least in part on an operator of the PLMN identified by the MNC 122.

As described herein, device settings 124 can include any type of device settings of client device, such as enabling or disabling an audible shutter sound, configuring a type of Wi-Fi channel, adjusting other settings associated with sounds or display, and so forth. In addition, device settings 124 which may be conformed to the attached wireless network 110, may include causing display of logos or branding associated with the operator of the attached wireless network, disabling or enabling Wi-Fi hotspots, enabling or disabling Wi-Fi calling, and so forth.

In order to determine the device settings 124 associated with the current geographic location or operator, adjustable settings module 108 can be implemented to consult a device settings database 112 which maps location-specific settings to various geographical locations (e.g., countries or regions). The device settings database 112 may also map operator-specific settings to various wireless network operators. In some cases the device settings database 112 includes executable code which may be applied to the client device 102 in order to automatically adjust the device settings 124 to conform to the location-specific settings and/or the operator-specific settings. Notably, in many cases the adjustable settings module 108 is configured to adjust device settings 124 such that the device settings cannot be manually overridden by the user. The device settings database 124 may be implemented at the client device 102. Alternately, the device settings database 112 may be at least partially implemented remote from client device 102, such that the device settings database 112 is accessible as a cloud service over network 110.

Figure 2:
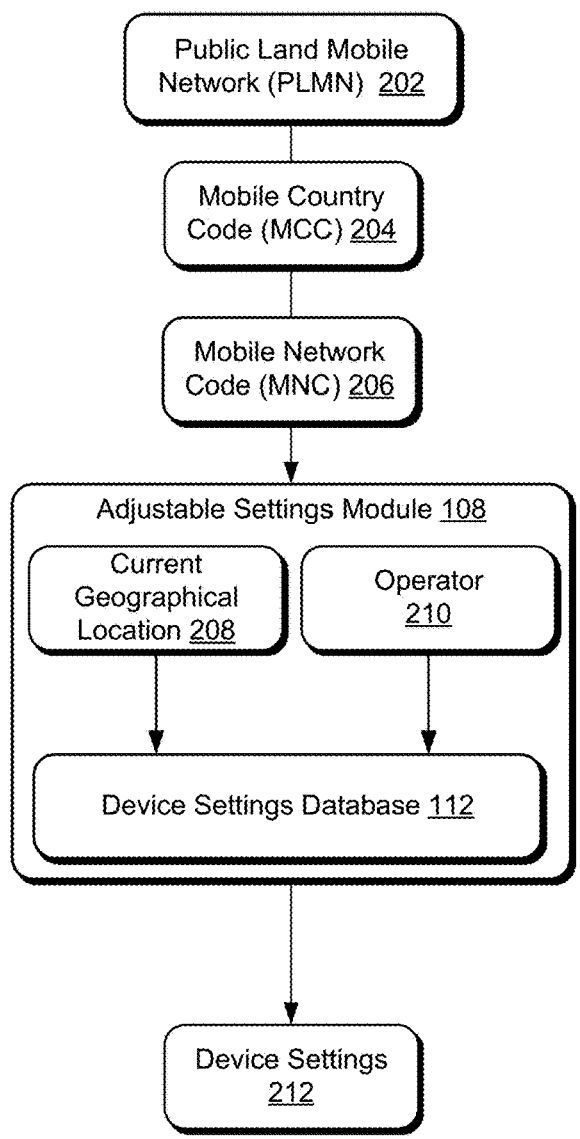
FIG. 2 illustrates an example system in which device settings of a client device are automatically adjusted based on information received from an attached wireless network.

FIG. 2 illustrates an example system 200 in which device settings of a client device are automatically adjusted based on information associated with an attached wireless network.

In example system 200, client device 102 attaches to a wireless network 110, which in this example is illustrated as a public land mobile network 202 (PLMN 202). For example, wireless radio 116 scans for available PLMNs, and then forms a wireless connection or attachment to PLMN 202.

After attaching to a wireless network, 108 receives location information and/or operator information from the attached wireless network 110. In this case, the location information corresponds to a mobile country code 204 (MCC 204) received from PLMN 202 which identifies a country of the PLMN 202, and the operator information corresponds to a mobile network code 206 (MNC 206) received from PLMN 202 which identifies the operator of PLMN 202.

Based on the location information, adjustable settings module 108 determines a current geographical location 208 of client device 102. For example, adjustable settings module 108 can determine the current geographical location based on the country identified by MCC 204 of PLMN 202. Similarly, based on the operator information, adjustable settings module 108 can determine an operator 210 of the attached wireless network 110. For example, adjustable settings module 108 determines the operator 210 based on the operator identified by the MCC 206 of PLMN 202.

The adjustable settings module 108 then determines device settings 212 to apply to the client device 102 based on the current geographical location 208 and/or the operator 210 of the attached wireless network. To do so, the adjustable settings module 108 compares the current geographical location 208 to the device settings database 112 in order to determine location-specific device settings 212 which are mapped to the current geographical location 208 in the device settings database 112. Similarly, the adjustable settings module 108 compares the operator 210 of the attached wireless network to the device settings database 112 to determine operator-specific device settings 212 which are mapped to the operator 210 in the device settings database 112.

Adjustable settings module 108 then applies the determined device settings 212 to client device 102 in order to adjust the device settings of client device 102 to conform to the location-specific settings of the current geographical location 208 and/or the operator-specific settings of the operator 210 of the PLMN 202 to which the client device 102 is attached. In some cases, the adjustable settings module 108 applies executable code referenced in the device settings database 112 in order to apply the device settings 212 to client device 102.

Figure 3:
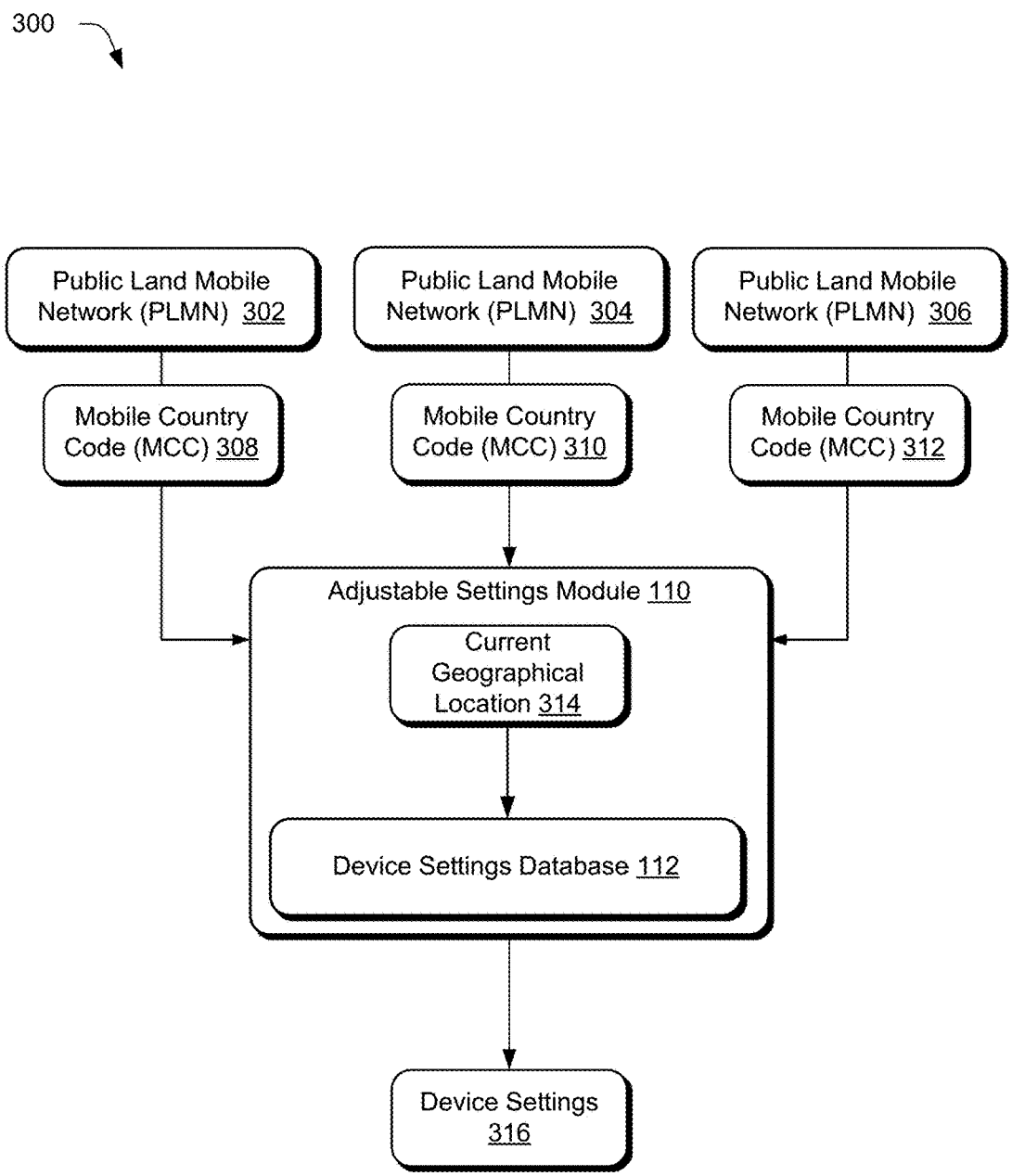
FIG. 3 illustrates an example system in which device settings of a client device are automatically adjusted based on information received from one or more detected wireless networks.

FIG. 3 illustrates an example system 300 in which device settings of a client device are automatically adjusted based on information received from one or more detected wireless networks.

In this example, client device 102 scans for and detects multiple available wireless networks 110, which in this example are illustrated as PLMN 302, PLMN 304, and PLMN 306. In some cases, adjustable settings module 108 may wait a particular period of time to determine whether or not the client device 102 will attach to one of the detected wireless networks. If client device 102 establishes a wireless connection with one of the available wireless networks, then the adjustable settings module 108 adjusts the device settings of the client device 102 based on the information associated with the attached wireless network, as discussed with regards to FIG. 2 above.

In this example, however, client device 102 does not establish a connection with any of the detected wireless networks (e.g., PLMN 302, 304, or 306) within the predetermined period of time. This may occur as the result of the user not paying to connect to any of the PLMNs.

Even though a connection is not established with any of the wireless networks, adjustable settings module 108 receives location information from one or more of the detected wireless networks. In this case, adjustable settings module receives location information from each of PLMNs 302, 304, and 306, which in this example includes mobile country codes (MCC) 308, 310, and 312 associated with PLMNs 302, 304, and 306, respectively.

Based on MCCs 308, 310, and 312, adjustable settings module 108 ascertains a current geographical location 314 of client device 102. For example, as discussed above, the MCC identifies a country of the PLMN. As such, by detecting the PLMNs, the adjustable settings module 108 can determine that the current geographical location 314 corresponds to the location identified in the detected PLMNs 302, 304, and 306.

The adjustable settings module 108 then determines device settings 316 based on the current geographical location 314. To do so, the adjustable settings module 108 compares the current geographical location 314 to the device settings database 112 in order to identify location-specific device settings 316 which are mapped to the current geographical location 314 in the device settings database 112. Notably, in this example, adjustable settings module 108 does not determine operator-specific device settings because the client device 102 has not attached to a wireless network.

Adjustable settings module 108 then applies the determined device settings 316 to client device 102 in order to adjust the device settings of client device 102 to conform to the location-specific settings of the current geographical location 314 client device 102. In some cases, the adjustable settings module 108 applies executable code referenced in the device settings database 112 in order to apply the device settings 212 to client device 102.

The methods described herein are shown as sets of blocks that specify operations performed but are not necessarily limited to the order or combinations shown for performing the operations by the respective blocks. The techniques are not limited to performance by one entity or multiple entities operating on one device.

FIG. 4 illustrates an example method 400 of adjustable device settings in accordance with one or more implementations.

At 402, a client device is configured with device settings that are compatible with multiple different geographical locations. For example, a client device 102 is configured with device settings 124 that are compatible with multiple different geographical locations. In some cases, the client device 102 is configured such that it is "legally compliant" with "country-specific requirements" of multiple different countries. In this way, rather than manufacturing the different versions of the client device for use in different countries, a single version of the client device 102 can be manufactured such that it conforms to legal requirements of multiple different countries.

At 404, the client device attaches to a wireless network via a wireless radio of the client device. For example, the client device 102 attaches to a wireless network 110 using a wireless radio 116. In one or more implementations, the client device attaches to a PLMN 118 using wireless radio 116.

At 406, location information is received from the attached wireless network. For example, adjustable settings module 108 receives location information associated with the attached wireless network 110. When the wireless network corresponds to PLMN 118, then the location information corresponds to MCC 120 which identifies a country of the PLMN 118.

At 408, a current geographical location of the client device is determined based at least in part on the location information received from the attached wireless network. For example, adjustable settings module 108 determines a current geographical location 208 based at least in part on the location information (e.g., MCC) received from the wireless network 110.

At 410, the device settings of the client device are adjusted to conform to location-specific settings of the current geographical location. For example, adjustable settings module 108 adjusts device settings 124 to conform to location-specific settings of the current geographical location, which may be identified in device settings database 112.

Optionally, at 412, the device settings of the client device are further adjusted to conform to operator-specific settings of an operator of the attached wireless network. For example, adjustable settings module 108 adjusts device settings 124 to conform to operator-specific settings of an operator of the attached wireless network. In one or more implementations, the operator of the attached wireless network may be determined from a MNC which identifies the operator of the wireless network 110

Figure 5:
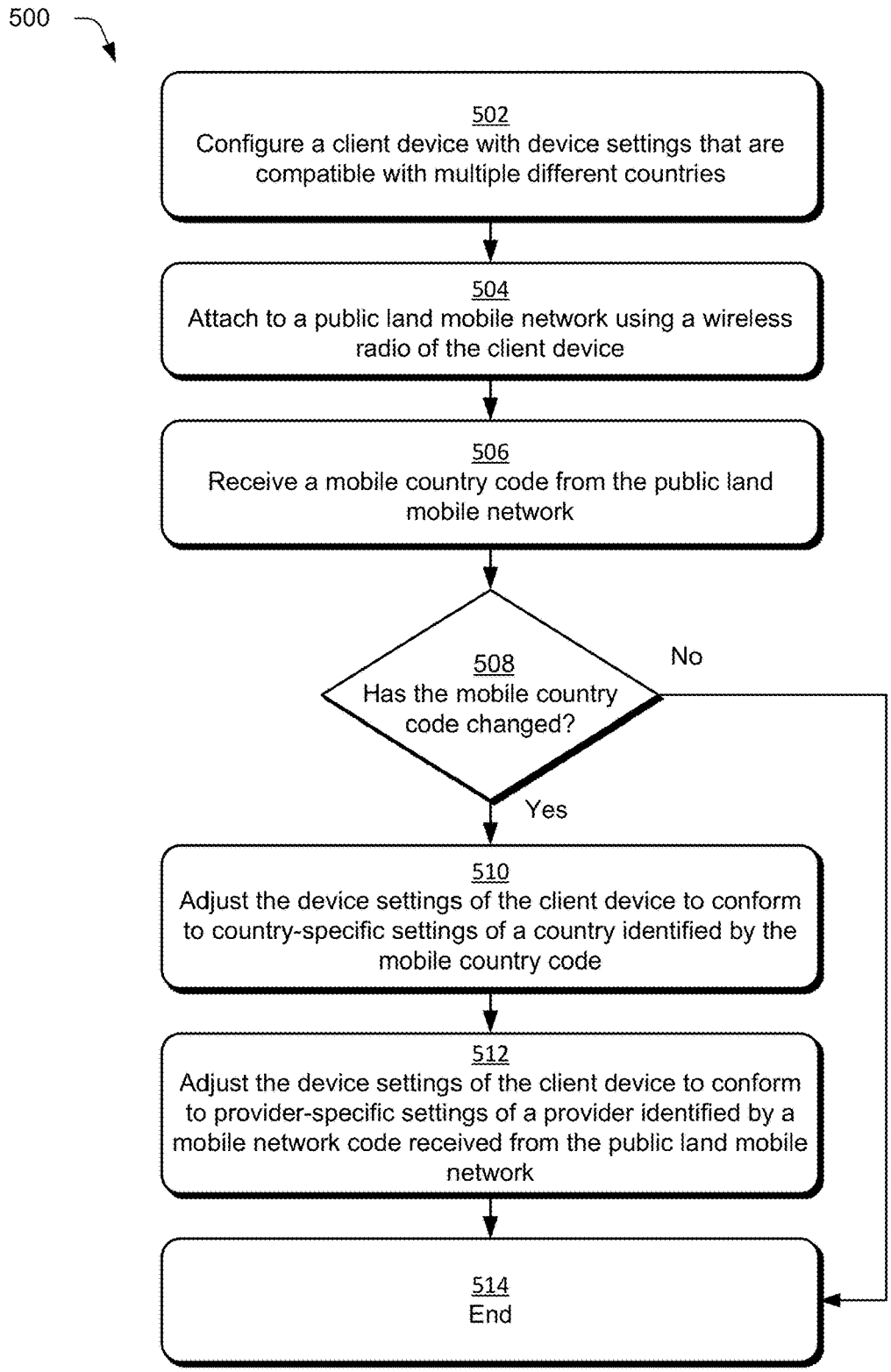
FIG. 5 illustrates an additional example method of adjustable device setting in accordance with one or more implementations.

FIG. 5 illustrates an additional example method 500 of adjustable device settings in accordance with one or more implementations. At 502, a client device is configured with device settings that are compatible with multiple different countries. In some cases, the client device 102 is configured such that it is "legally compliant" with "country-specific requirements" of multiple different countries. In this way, rather than manufacturing the different versions of the client device for use in different countries, a single version of the client device 102 can be manufactured such that it conforms to legal requirements of multiple different countries.

At 504, the client device attaches to a public land mobile network using a wireless radio of the client device. For example, client device 102 attaches to PLMN 118 using wireless radio 116 of client device 102.

In response to attaching to the public land mobile network, at 506 a mobile country code is received from the public land mobile network. For example, adjustable settings module 108 of client device 102 receives MCC 120 from PLMN 118.

At 508, it is determined whether the mobile country code has changed. For example, adjustable settings module 108 compares the received MCC 120 to a previous mobile country code value. When the device is originally manufactured, the previous mobile country code value may be set to a value of null. Thus, the first time that the client device 102 attaches to a PLMN, the adjustable settings module 108 will determine that the MCC 120 has changed, and will set the previous mobile country code value to the value of the received MCC 120. If the client device 102 then becomes disconnected from the PLMN, the next time that the client attaches to the PLMN the adjustable settings module 108 will determine that the MCC has not changed. In response to determining that the MCC has not changed, the device setting do not need to be updated, and the process ends at 514.

Alternately, if it is determined that the mobile country code has not changed, then at 510 the device settings of the client device are adjusted to conform to country-specific settings of a country identified by the mobile country code. For example, adjustable settings module 108 adjusts device settings 124 to conform to country-specific settings of a country identified by the MCC 120. As discussed above, the adjustable settings module 108 will detect a change to the mobile country code if this is the first time that the client device has attached to a PLMN, or if the client device 102 is taken to a different country.

Optionally, at 512, the device settings of the client device can be further adjusted to conform to operator-specific settings of an operator identified by a mobile network code received from the public land mobile network. For example, adjustable settings module 108 adjusts the device settings 124 of client device 102 to conform to operator-specific settings of an operator identified by a mobile network code 122.

Figure 6:
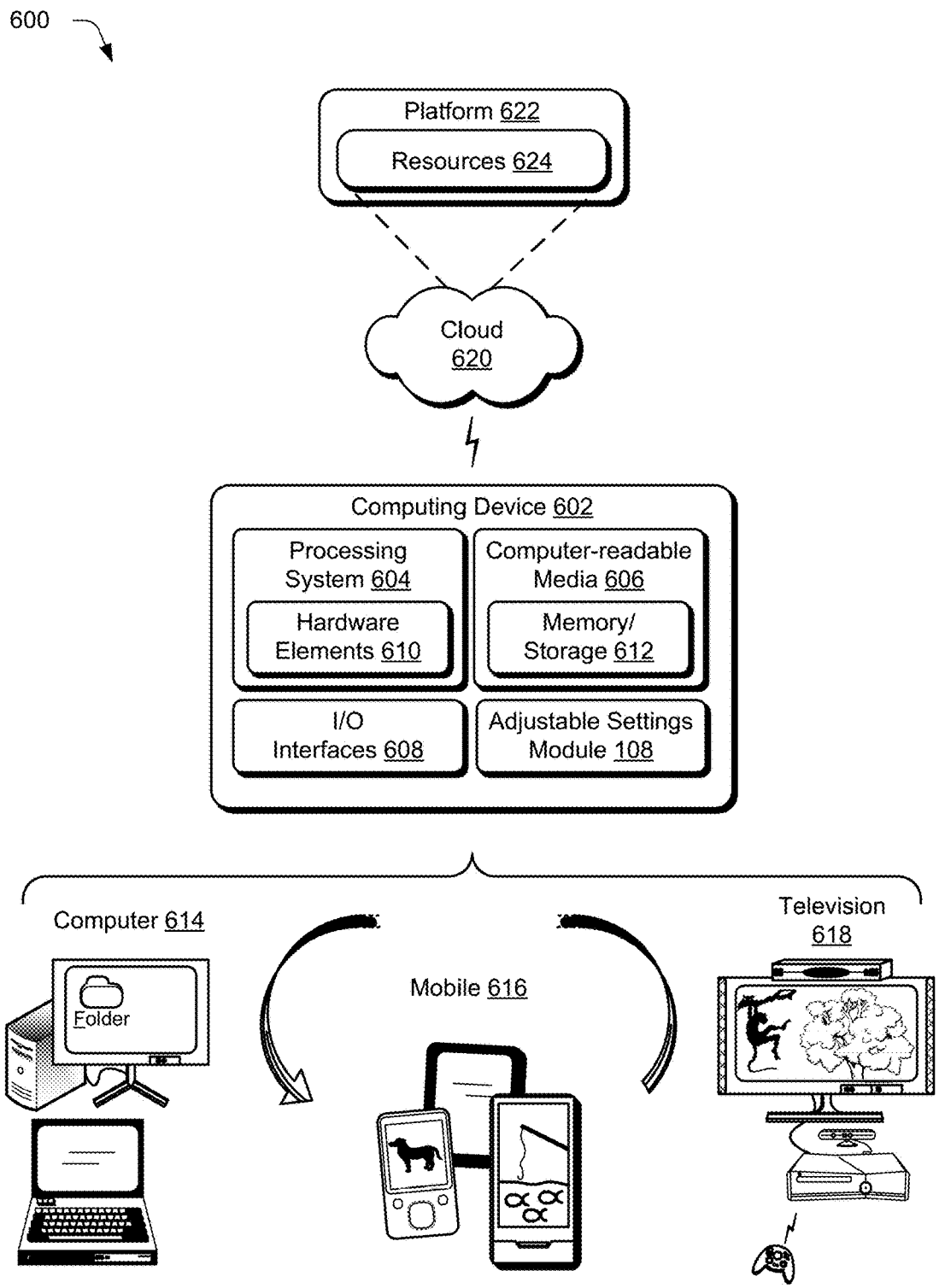
FIG. 6 illustrates an example system that includes an example computing device that is representative of one or more computing systems and/or devices that may implement the various techniques described herein.

FIG. 6 illustrates an example system generally at 600 that includes an example computing device 602 that is representative of one or more computing systems and/or devices that may implement the various techniques described herein. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 602, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some examples to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including adjustable settings module 108, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In an implementation, the central computing device may be a cloud of one or more server computers that are connected to the multiple devices through a network, the Internet, or other data communication link.

In an example, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In another example, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the adjustable settings module 108 on the computing device 602. The functionality of the adjustable settings module 108 and other modules may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device example, implementation of functionality described herein may be distributed throughout the system 600. For example, the functionality may be implemented in part on the computing device 602 as well as via the platform 622 that abstracts the functionality of the cloud 620.

Example implementations described herein include, but are not limited to, one or any combinations of one or more of the following examples:

In one or more examples, a computer-implemented method comprises: configuring a client device with device settings that are compatible with multiple different geographical locations; attaching to a wireless network via a wireless radio of the client device; receiving location information from the attached wireless network; determining a current geographical location of the client device based at least in part on the location information received from the wireless network; and adjusting the device settings of the client device to conform to location-specific settings of the current geographical location.

An example as described alone or in combination with any of the other examples described above or below, further comprising adjusting the device settings of the client device to conform to operator-specific settings of an operator of the attached wireless network.

An example as described alone or in combination with any of the other examples described above or below, wherein determining the current geographical location comprises determining a current country of the client device, and wherein the adjusting comprises adjusting the device settings of the client device to conform to legal requirements of the current country of the client device.

An example as described alone or in combination with any of the other examples described above or below, wherein the adjusting the device settings further comprises accessing a device settings database which maps geographical locations to location-specific settings.

An example as described alone or in combination with any of the other examples described above or below, wherein the adjusting comprises enabling at least one device setting of the client device.

An example as described alone or in combination with any of the other examples described above or below, wherein the adjusting comprises disabling at least one device setting of the client device.

An example as described alone or in combination with any of the other examples described above or below, wherein the wireless network comprises a public land mobile network (PLMN).

An example as described alone or in combination with any of the other examples described above or below, wherein the location information comprises a mobile country code (MCC) of the PLMN.

An example as described alone or in combination with any of the other examples described above or below, further comprising: determining an operator of the PLMN based on a mobile network code (MNC) received from the PLMN; and adjusting the device settings of the client device to conform to operator-specific settings of the operator of the PLMN.

In one or more examples, a client device is configured with device settings that are compatible with multiple different geographical locations, the client device comprises: a wireless radio; at least a memory and a processor to implement an adjustable settings module configured to: determine a current geographical location of the client device based on location information received from one or more wireless networks detected by the wireless radio; and adjust the device settings of the client device to conform to location-specific settings of the current geographical location.

An example as described alone or in combination with any of the other examples described above or below, wherein the one or more wireless networks comprise one or more public land mobile networks (PLMNs), and wherein the location information comprises a mobile country code of the one or more PLMNs.

An example as described alone or in combination with any of the other examples described above or below, wherein the adjustable settings module is configured to determine the current geographical location based on receiving a mobile country code (MCC) from a PLMN to which the client device is attached.

An example as described alone or in combination with any of the other examples described above or below, wherein the adjustable settings module is further configured to adjust the device settings of the client device to conform to operator-specific settings of an operator of the attached PLMN.

An example as described alone or in combination with any of the other examples described above or below, wherein the operator of the attached wireless network is determined based on a mobile network code (MNC) received from the attached PLMN.

An example as described alone or in combination with any of the other examples described above or below, wherein the adjustable settings module is configured to determine the current geographical location based on receiving a mobile country code (MCC) from one or more detected PLMNs without forming an attachment to any of the one or more PLMNs.

An example as described alone or in combination with any of the other examples described above or below, further comprising a device settings database which maps geographical locations to location-specific settings.

An example as described alone or in combination with any of the other examples described above or below, wherein the client device comprises a smartphone, a tablet computing device, or a laptop computing device.

In one or more example, a computer-implemented method comprises: configuring a client device with device settings that are compatible with multiple different countries; attaching to a public land mobile network using a wireless radio of the client device; receiving a mobile country code from the public land mobile network; comparing the mobile country code to a previous mobile country code value to determine if the mobile country code has changed; responsive to determining that the mobile country code has changed, adjusting the device settings of the client device to conform to country-specific settings of a country identified by the mobile country code; and adjusting the device settings of the client device to conform to operator-specific settings of an operator identified by a mobile network code received from the public land mobile network.

An example as described alone or in combination with any of the other examples described above or below, wherein the previous mobile country code value is initially set to a value of null.

An example as described alone or in combination with any of the other examples described above or below, wherein the adjusting the device settings of the client device to conform to country-specific device settings further comprises disabling or enabling at least one device setting.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computer-implemented method comprising:
    configuring a client device with device settings that are compatible with multiple different geographical locations;
    attaching to a wireless network via a wireless radio of the client device;
    receiving location information from the attached wireless network;
    determining a current geographical location of the client device based at least in part on the location information received from the wireless network; and
    adjusting the device settings of the client device to conform to location-specific settings of the current geographical location, the adjusted device settings comprising at least one adjusted device setting which cannot be manually overridden by a user of the client device.

2. The computer-implemented method of claim 1, further comprising adjusting the device settings of the client device to conform to operator-specific settings of an operator of the attached wireless network.

3. The computer-implemented method of claim 1, wherein
    determining the current geographical location comprises determining a current country of the client device, and wherein the adjusting comprises adjusting the device settings of the client device to conform to legal requirements of the current country of the client device.

4. The computer-implemented method of claim 1, wherein the adjusting the device settings further comprises accessing a device settings database which maps geographical locations to location-specific settings.

5. The computer-implemented method of claim 1, wherein the adjusting comprises enabling at least one device setting of the client device.

6. The computer-implemented method of claim 1, wherein the adjusting comprises disabling at least one device setting of the client device.

7. The computer-implemented method of claim 1, wherein the wireless network comprises a public land mobile network (PLMN).

8. The computer-implemented method of claim 7, wherein the location information comprises a mobile country code (MCC) of the PLMN.

9. The computer-implemented method of claim 7, further comprising:
    determining an operator of the PLMN based on a mobile network code (MNC) received from the PLMN; and
    adjusting the device settings of the client device to conform to operator-specific settings of the operator of the PLMN.

10. A client device configured with device settings that are compatible with multiple different geographical locations, the client device comprising:
    a wireless radio;
    at least a memory and a processor to implement an adjustable settings module configured to:
    determine a current geographical location of the client device based on location information received from one or more wireless networks detected by the wireless radio; and
    adjust the device settings of the client device to conform to location-specific settings of the current geographical location, the adjusted device settings comprising at least one adjusted device setting which cannot be manually overridden by a user of the client device.

11. The client device of claim 10, wherein the one or more wireless networks comprise one or more public land mobile networks (PLMNs), and wherein the location information comprises a mobile country code of the one or more PLMNs.

12. The client device of claim 10, wherein the adjustable settings module is configured to determine the current geographical location based on receiving a mobile country code (MCC) from a PLMN to which the client device is attached.

13. The client device of claim 12, wherein the adjustable settings module is further configured to adjust the device settings of the client device to conform to operator-specific settings of an operator of the attached PLMN.

14. The client device of claim 13, wherein the operator of the attached wireless network is determined based on a mobile network code (MNC) received from the attached PLMN.

15. The client device of claim 11, wherein the adjustable settings module is configured to determine the current geographical location based on receiving a mobile country code (MCC) from one or more detected PLMNs without forming an attachment to any of the one or more PLMNs.

16. The client device of claim 11, further comprising a device settings database which maps geographical locations to location-specific settings.

17. The client device of claim 10, wherein the client device comprises a smartphone, a tablet computing device, or a laptop computing device.

18. A computer-implemented method comprising:
    configuring a client device with device settings that are compatible with multiple different countries;
    attaching to a public land mobile network using a wireless radio of the client device;
    receiving a mobile country code from the public land mobile network;
    comparing the mobile country code to a previous mobile country code value to determine if the mobile country code has changed;
    responsive to determining that the mobile country code has changed, adjusting the device settings of the client device to conform to country-specific settings of a country identified by the mobile country code; and
    adjusting the device settings of the client device to conform to operator-specific settings of an operator identified by a mobile network code received from the public land mobile network, the adjusted device settings comprising at least one adjusted device setting which cannot be manually overridden by a user of the client device.

19. The computer-implemented method of claim 18, wherein the previous mobile country code value is initially set to a value of null.

20. The computer-implemented method of claim 18, wherein the adjusting the device settings of the client device to conform to country-specific device settings further comprises disabling or enabling at least one device setting.

* * * * *